A. F. LIDEN.
TOOL HOLDER.
APPLICATION FILED FEB. 13, 1909.
943,087.
Patented Dec. 14, 1909.
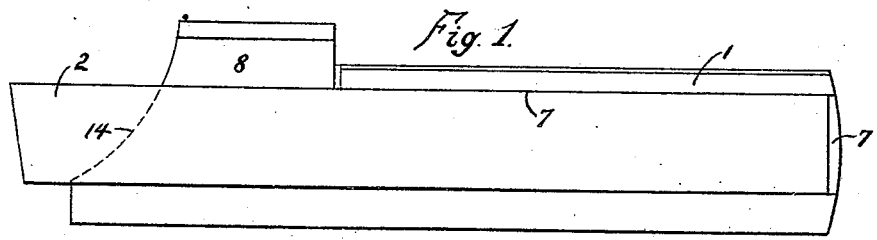
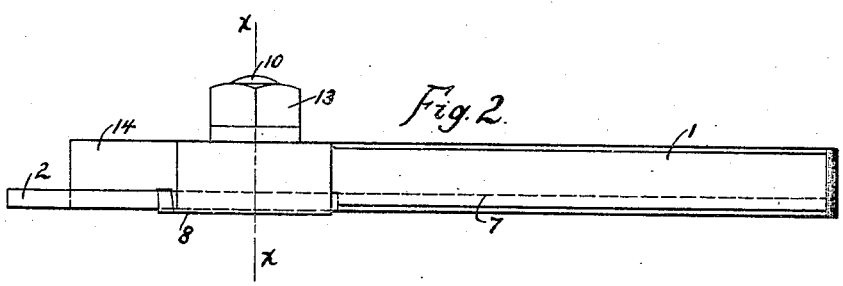
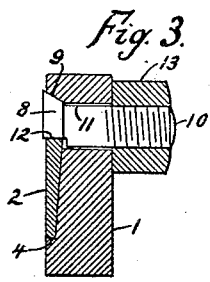
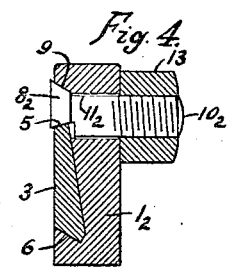
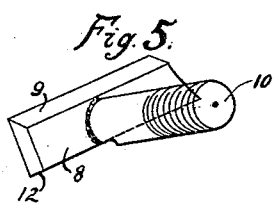
WITNESSES:
Constan Carlson
O. J. Nothenberg, M. D.
INVENTOR:
GUST FERDINAND LIDEN
BY Frederick R. Parker
ATTORNEY.

UNITED STATES PATENT OFFICE.

AUGUST FERDINAND LIDEN, OF CHICAGO, ILLINOIS.

TOOL-HOLDER.

943,087.

Specification of Letters Patent.   Patented Dec. 14, 1909.

Application filed February 13, 1909.   Serial No. 477,712.

*To all whom it may concern:*

Be it known that I, AUGUST FERDINAND LIDEN, a subject of the King of Sweden, residing at Chicago, in the county of Cook and State of Illinois, have invented a new and useful Tool-Holder, of which the following is a specification, reference being had to the accompanying drawings, illustrating same.

My invention relates to tool holders used on lathes and other machines.

The principal object of my invention is to provide improved means for clamping the cutting blade in place in such a tool holder.

Other objects will be apparent from the following specification.

In the accompanying drawings Figure 1 is a side elevation of the improved tool of this invention; Fig. 2 is a top view of Fig. 1; Fig. 3 is a transverse cross-sectional view of the tool, taken on line $x$ $x$ of Fig. 2, with portions shown in elevation; Fig. 4 is a view similar to Fig. 3, for a tool holder adapted to hold a side-cutting tool, Fig. 3 illustrating a tool holder adapted to hold a cutting-off tool; and Fig. 5 is a perspective view of the clamping bar used in the tool of the invention.

Like characters refer to like parts in the several figures.

In the drawings 1 represents the holder for the cutting blade, which may be either a cutting-off blade 2 or a side-cutting blade 3, the construction of such blades being well understood.

In Fig. 3 it is seen that the blade 2 is slightly beveled downwardly as at 4, the holder 1 being constructed to fit the blade 2.

In Fig. 4 it is seen that the blade 3 is slightly beveled upwardly as at 5 and beveled downwardly as at 6, the holder $1_2$ being constructed to fit the blade 3.

The blade 2 (or 3), it will be seen is slidably mounted in a longitudinal slot 7 of the holder 1, as shown in Figs. 1 and 2, the cross-section of the slot 7 being shown in Fig. 3 (or Fig. 4).

The clamping bar 8 has a flat beveled surface 9 on the top side thereof, as shown in Fig. 5, the said bar carrying a clamping bolt 10 which extends through a hole 11 (or $11_2$) in the holder 1, as shown in Fig. 3 (or Fig. 4). The bottom surface 12 of the clamping bar 8 is preferably in a plane parallel with the longitudinal axis of the bolt 10, in the case of the cutting-off tool shown in Figs. 1, 2 and 3, but is preferably inclined out of this plane in the case of the side-cutting tool shown in Fig. 4. The flat beveled surface 9 of the clamping bar 8 is adapted to engage a corresponding flat beveled surface on the holder 1, as shown in Figs. 3 and 4, when the bolt 10 (or $10_2$) is placed through the holder 1 (or $1_2$). It will readily be seen that in either the cutting-off tool or the side-cutting tool, the cutting blade will be rigidly clamped in place by the clamping bar 8 (or $8_2$), when the nut 13 is tightened up on the bolt 10 (or $10_2$).

The flat beveled surface 9 of the clamping bar 8, (or $8_2$) fitting the corresponding flat beveled surface on the holder 1, has the advantage over such tools where a round beveled surface is used, in that with the flat beveled surface 9 there is always a bearing between the clamping bar and holder clear along the surface 9 from one end of the bar 8 to the other, with considerable variation in the widths of various cutting blades; while with a round tapered surface as on a clamping bolt having a conically-shaped head, there is a bearing between the curved tapered surfaces of the clamping head and holder at a line only, with slight variations in the widths of the cutting blades. Thus it will be seen that the tool of the present invention is a great improvement over other such tools heretofore made, in the substantial manner in which it rigidly clamps the cutting blade in place.

I preferably cut the nose of the tool holder 1 away as shown at 14, so that the holder may be placed very close to the piece on which the tool is cutting.

In the case of the cutting-off tool, I preferably make the top surface 12 of the blade 2 at right angles to the outside side surface of the blade, so that the top surface 12 will be horizontal when the holder is in an upright position.

I do not wish to limit this invention to all of the exact details of construction herein shown, as various modifications of same may be made without departing from the scope of the appended claim.

What I claim as my invention is:

A tool of the character described comprising a holder, a cutting blade carried by the holder, a clamping bar engaging the cutting blade throughout the length of the bar and having a flat beveled surface throughout its length engaging a flat beveled surface on the holder, a bolt carrying the said clamping bar and extending through a hole in the said holder, and a nut on the said bolt adapted to be tightened up thereon to draw the said beveled surfaces together for purposes substantially as described.

As inventor of the foregoing, I hereunto subscribe my name this 10th day of February 1909.

GUST. FERDINAND LIDEN.

Witnesses:
CONSTAN CARLSON,
O. J. NOTHENBERG.